United States Patent [19]
Guinet

[11] Patent Number: 6,014,001
[45] Date of Patent: Jan. 11, 2000

[54] METHOD FOR POWERING AN ELECTRONICALLY SWITCHED VARIABLE RELUCTANCE MOTOR, AND POWER SUPPLY CIRCUIT THEREFOR

[75] Inventor: Michel Guinet, Cambes-en-Plaines, France

[73] Assignee: Moulinex S.A., Paris, France

[21] Appl. No.: 09/117,069

[22] PCT Filed: Jan. 20, 1997

[86] PCT No.: PCT/FR97/00109

§ 371 Date: Jul. 22, 1998

§ 102(e) Date: Jul. 22, 1998

[87] PCT Pub. No.: WO97/27665

PCT Pub. Date: Jul. 31, 1997

[30] Foreign Application Priority Data

Jan. 22, 1996 [FR] France ................................. 96 00674

[51] Int. Cl.⁷ ................................ H02P 5/05; H02P 3/06
[52] U.S. Cl. .......................... 318/701; 318/254; 318/448
[58] Field of Search ................................ 318/254, 432, 318/433, 438, 448, 685, 696, 701

[56] References Cited

U.S. PATENT DOCUMENTS

| 5,115,181 | 5/1992 | Sood ........................................ 318/701 |
| 5,424,624 | 6/1995 | Senak, Jr. ................................ 318/701 |
| 5,710,699 | 1/1998 | King et al. .............................. 363/132 |
| 5,742,146 | 4/1998 | Langhorst ................................ 318/701 |

FOREIGN PATENT DOCUMENTS 0 678 972  10/1995  European Pat. Off. .

OTHER PUBLICATIONS

Krishnan et al., "Effect of Power Factor Correction Circuit on Switched Reluctance Motor Drives for Appliances", Proceedings from the Annual Applied Power Electronics Conference and Exposition, Orlando Feb. 13, 1994, vol. 1 pp. 83–89.

Ehsani et al., "Development of a Unipolar Converter for Variable Reluctance Motor Drive", IEEE Transactions on Industry Applications, vol. IA–23, No. 3, May 1987, pp. 545–552.

*Primary Examiner*—Bentsu Ro
*Attorney, Agent, or Firm*—Young & Thompson

[57] ABSTRACT

A method for powering an electronically switched variable reluctance motor (100) from a single-phase AC voltage source (17) is disclosed. Each phase of the motor is sequentially subjected to a magnetizing sequence, a demagnetizing sequence and an energy transfer to a storage capacitor (C) common to all the phases. Feedback sequences (R) in which the energy stored in the storage capacitor (C) is returned to the rectifier stage (15) are performed by controlling a chopping switch (TH) connected in series to the storage capacitor (C). The method includes a step of monitoring the energy returned to the rectifier stage (15) in order to correct instability in the rectified power supply current (Ia) relative to a reference current wave, and modulating the cyclical chopping ratio around a substantially constant mean value. The method is useful for powering household appliances.

14 Claims, 6 Drawing Sheets

METHOD FOR POWERING AN ELECTRONICALLY SWITCHED VARIABLE RELUCTANCE MOTOR, AND POWER SUPPLY CIRCUIT THEREFOR

This application is the National Stage of International Application PCT/FR97/00109 under 35 USC §371, filed Jan. 20, 1997.

The present invention relates to a process for supplying a variable reluctance motor with electronic switching. It also relates to a supply circuit for practicing this process.

The supply of DC current of a variable reluctance motor with electronic switching from a mono-phase power supply generally uses a rectifier stage and a converter stage comprising electronic switching means that is driven from instructions and positional information from detectors, to supply the different phases of this motor. The present invention relates more particularly to the case of variable reluctance motors with electronic switching supplied from a capacitor of the C-Dump type with current monitored as shown for example in the article "Switched Reluctance Drives: New Aspects", *IEEE Transactions on Power Electronics,* Volume 5, No. 4, October 1990.

It is to be noted that in present processes for supplying a motor with electronic switching, and particularly in the supply process used for the C-Dump type converter, the rectified current delivered by the rectifier stage is subject to disturbances with multiple frequencies of the frequency sector. These disturbances can lead to exceeding the harmonic values of current permitted by the European standard CEI 555-2. At present, this problem is handled by filtering the current delivered by the rectifier stage so as to eliminate current harmonics higher than the frequency of the sector. There is inserted for example a passive filter (based on filters L, C) or an active filter (of the PFC: "Power Factor Correction" type), between the rectifier stage and the converter stage, as shown for example by the article "Effect of Power Factor Correction Circuit on Switched Reluctance Motor Drives for Appliances" by R. KRISHNAN and S. LEE, *APEC* 94, Volume 1, Orlando, Feb. 13–17, 1994. The addition of a filter upstream of the converter stage however leads to a significant increase in electronic costs when the powers to be controlled exceeds several hundred Watts.

The object of the invention is to overcome these drawbacks by providing a process to supply a variable reluctance motor with electronic switching, which permits satisfying both the requirements of low cost and respect for the harmonic limit levels imposed by the mentioned European standard.

These objects are achieved by a process for supplying a variable reluctance motor with electronic switching from a single phase AC voltage source, comprising:
rectifying, in a rectifier stage, the voltage delivered by the single phase AC source to supply a rectified voltage,
successively, for each of the phases of this motor:
a sequence of magnetization of said phase comprising an energy transfer from the rectifier stage toward said phase to which is applied the rectified voltage by closing switching means associated with said phase,
demagnetization sequence of said phase comprising a transfer of energy from said phase toward a storage condenser common to all the phases, while said switching means is opened, and
sequences of the return of stored energy in the capacity toward the rectifier stage by control of chopping means in series with the storage capacitor.

According to the invention, the process comprises monitoring the energy return toward the rectifier stage, so as to correct disturbances of the rectified supply current.

It thus becomes possible to correct the disturbances of the supply current and to be in conformity with the present requirements as to compatibility of electromagnetic material, without having to use systematically a passive or active filter upstream of the converter stage, and by using in a rational manner the energy resources normally present in the condenser of a converter of the C-Dump type. There results a significant economic gain relative to known solutions.

There is meant more generally by disturbance of the current, any deformation of the current wave relative to a reference current wave, this deformation being able to be induced by any physical phenomenon identified or not, of an origin internal or external to the drive system in question.

Disturbances of the rectified supply current can for example be corrected relative to a reference current wave. In a particular embodiment of the process according to the invention, the monitoring of the returned energy comprises a modulation of the cyclic chopping ratio. It can be provided for example that this cyclic ratio be modulated about a substantially constant mean value. The mean value of the cyclic ratio for chopping is thus preferably selected to be about ½ to maintain a mean value of the voltage at the terminals of the storage capacitor about twice the rectified supply voltage, so as to ensure correct demagnetization of the phases of the motor.

In a preferred embodiment, this process comprises moreover a measurement of the rectified supply current, and a comparison of this measured current with the reference current wave, to determine the disturbances to be corrected.

In a first embodiment of the process according to the invention, during the energy return sequence, an inductance serving as a magnetic buffer is interposed between the storage capacitor and the converter stage.

In a second embodiment of the process according to the invention, during the energy return sequence, the energy stored in the condenser is directly transferred toward the converter stage, and the process thus comprises a filtering of the rectified supply current.

Moreover, the process according to the invention can preferably comprise also a correction of the power factor of the motor/converter stage assembly as a function particularly of the measurement of the rectified supply voltage and of the rectified supply current.

According to another aspect of the invention, there is proposed a circuit to supply a variable reluctance motor with electronic switching, comprising:
a rectifier stage to deliver from a single phase AC voltage source, a rectified voltage,
a converter stage to supply each of the phases of said motor, this converter stage comprising, for each phase, a phase switching means controlled to magnetize in a predetermined time window, said phase by use of the rectified voltage, these switching means being moreover controlled to demagnetize said phase by transfer of magnetic energy stored in said phase toward a storage capacitor common to all the phases of the motor,
means to return the energy stored in the storage capacitor toward the rectifier stage, comprising chopping means in series with the storage capacitor, and
means to control the phase switching means and the chopping means, as a function particularly of operating instructions and measurements of electrical magnitude, particularly the rectified supply current and the voltage at the terminals of the storage capacitor.

According to the invention, the control means are arranged to control according to a variable cyclic ratio the chopping means so as to correct the disturbances observed in the rectified supply current.

In a first embodiment of a circuit according to the invention, the latter comprises moreover an inductance disposed between the chopping means and the converter stage and serving as a magnetic buffer.

In a second embodiment of a circuit according to the invention, the latter comprises moreover a filter stage disposed between the rectifier stage and the converter stage.

Other features and advantages of the invention will become apparent from the following description. In the accompanying drawings, given by way of non-limiting example:

There will now be described, with reference to the foregoing figures, the general structure of a supply circuit according to the invention and two examples of embodiment, at the same time as the supply process used in these circuits.

Figure 1:
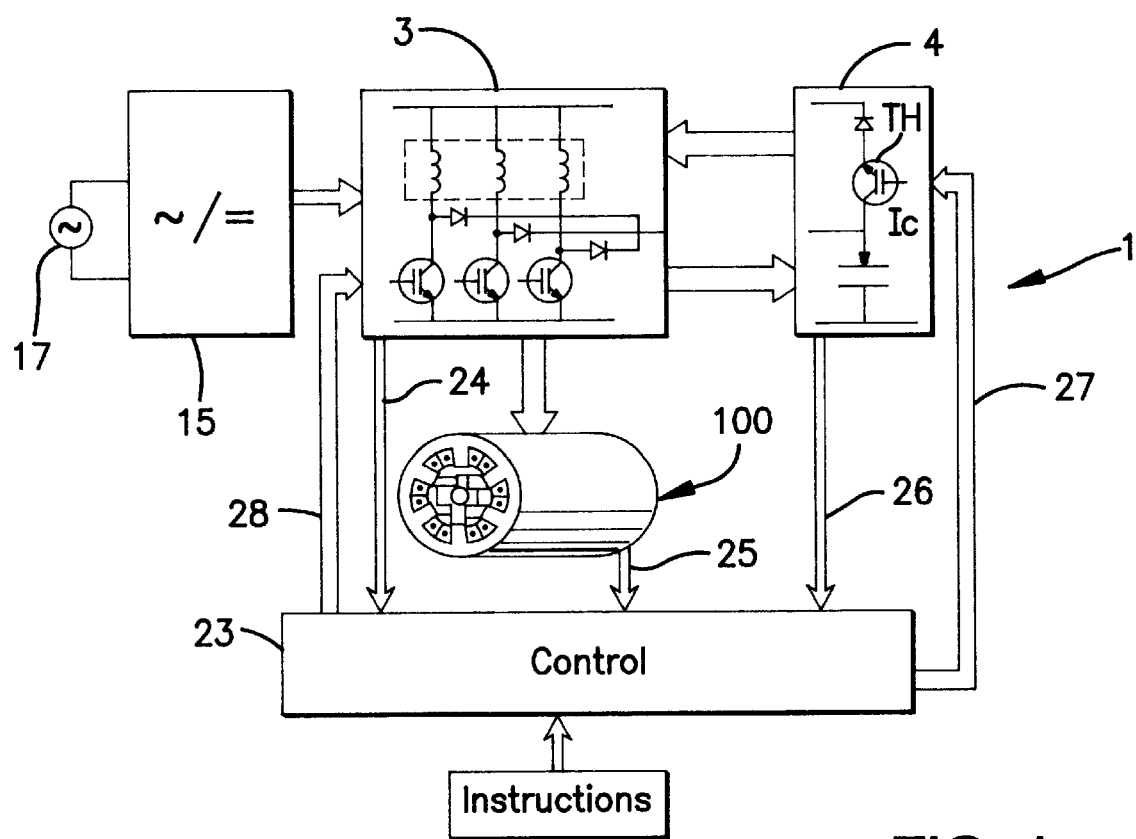
FIG. 1 is a synoptic diagram of a motor system with variable reluctance for practicing the process and the supply circuit according to the invention.

A variable speed drive system 1 using the process according to the invention comprises, with reference to FIG. 1, a rectifier stage 15 connected to a source of single phase AC voltage 17, for example the sector, a converter stage 3 supplying the three phases of a variable reluctance motor with electronic switching 100, a stage 4 for energy return, and a control device 23 receiving at its input instructions, data 25 as to angular position of the rotor of the motor and measurements 24, 26 of the physical size associated with the system, and generating control orders 28, 27 for electronic switches of the converter stage 3 and a chopping switch TH of the energy return stage 4.

Figure 2:
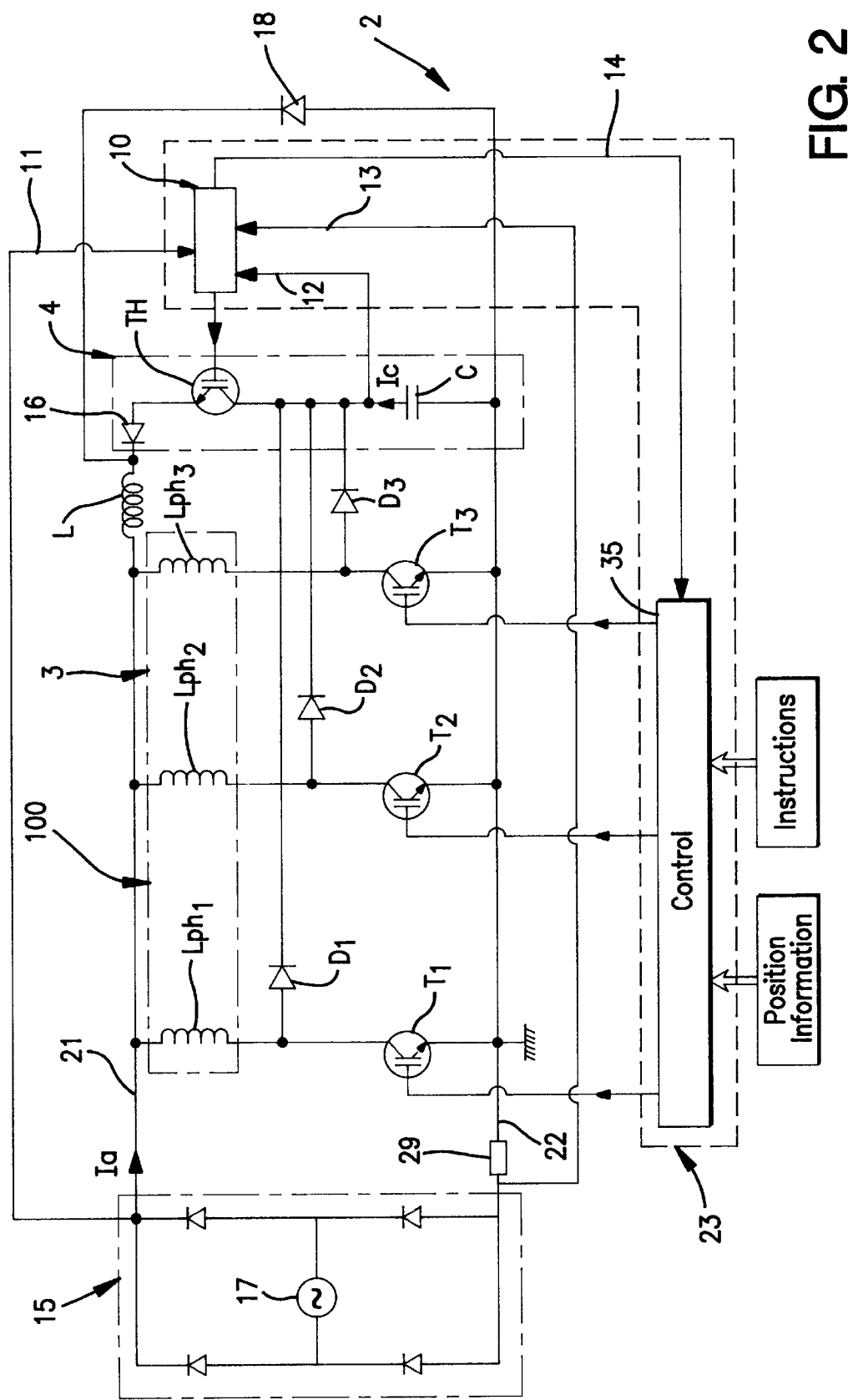
FIG. 2 shows a first embodiment of a supply circuit according to the invention.

In a first embodiment of the supply circuit 2 shown in FIG. 2, the converter stage 3 is directly connected to the output of the rectifier stage 15 without use of a filter, and an inductance L is disposed between the common high point of the converter stage 3 and the energy return stage 4. The rectifier stage 15 can have the conventional structure of a four-diode bridge. The converter stage 3 is of the C-Dump type. It comprises a high line 21 and a low line 22 connected respectively to the output terminals of the rectifier stage 15, and three branches connected in parallel each comprising a power switch T1, T2, T3, for example a transistor IGBT, connected on the one hand to one terminal of a phase of the motor 100, and on the other hand to the low line 22. The three phases Lph1, Lph2, Lph3 are connected in star fashion and their common connection is connected to the high line of the converter stage 3. Moreover, a free wheel diode 18 is conventionally provided between the high and low lines 21, 22 to ensure continuity of current drawn by the converter stage 3 and thus to avoid overvoltage. At each connection point of a switch T1, T2, T3 and of the phase Lph1, Lph2, Lph3 which is associated with it is connected the anode of demagnetization diode D1, D2, D3. The energy return stage 4 comprises in series a storage capacitor C, a chopping switch TH and a diode 16. The cathodes of the three demagnetization diodes D1, D2, D3 are connected to the connection point between the storage capacitor C and the chopping switch TH which can for example be an IGBT transistor. A control device 23 for the system 1 comprises a control module 10 for the chopping switch TH and a control module 35 for the three phase switches T1, T2, T3. The chopping control module 10 receives a measurement 11 of the rectified supply voltage, a measurement 12 of the voltage at the two terminals of the storage capacitor C, a measurement 13 of the rectified supply current Ia supplied to the terminals of a shunt 29, and in turn generates control orders for the chopping switch TH and control orders 14 for the phase control module 35. This latter also receives position data as to the rotor of the motor, supplied for example by an angular position detector, and operating instructions, for example a speed instruction, and generates in turn control orders for the phase switches T1, T2, T3.

There will now be described the operation of this supply circuit according to the invention, as well as the energy transfers carried out in the course of the different sequences of the process according to the invention, with reference to FIGS. 2 and 3A to 3C. It should be noted that, for reasons of simplicity, the energy flow in FIGS. 3A to 3C is shown only for a single phase.

The rectifier stage 15 delivers a rectified voltage in the form of double alternating arches. The rectified supply current Ia withdrawn by this rectifier stage 15 is a function of the different phase switchings which are carried out with variable frequency. The object of the process according to the invention is to approach a rectified supply current which will have the hypothetical wave form of that of the rectified voltage. Each phase Lph1, Lph2, Lph3 of the motor 100 is subjected to successive magnetization sequences (M) and demagnetization sequences (D) at the rhythm of the phase switching.

It should be noted that, according to the control modes used, there can be simultaneously a magnetization sequence of one phase and a demagnetization sequence of another phase. More generally, the supply process according to the invention can be used no matter what the level of superposition between respective sequences of magnetization and demagnetization concerning the different phases of the motor.

Figure 3A:
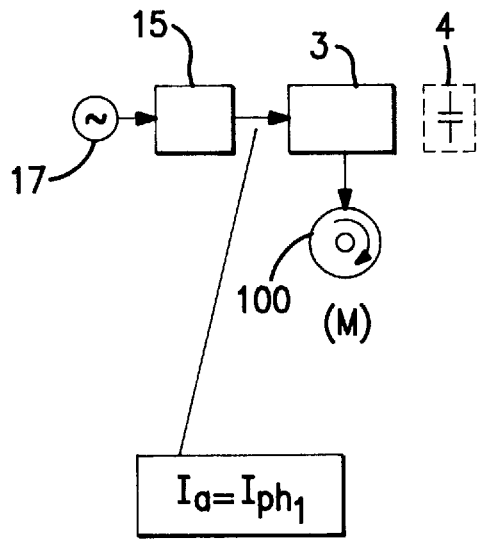
FIGS. 3A, 3B and 3C show schematically the energy transfers in the circuit shown in FIG. 2, respectively in the sequences of magnetization, demagnetization and energy return.
Figure 3B:
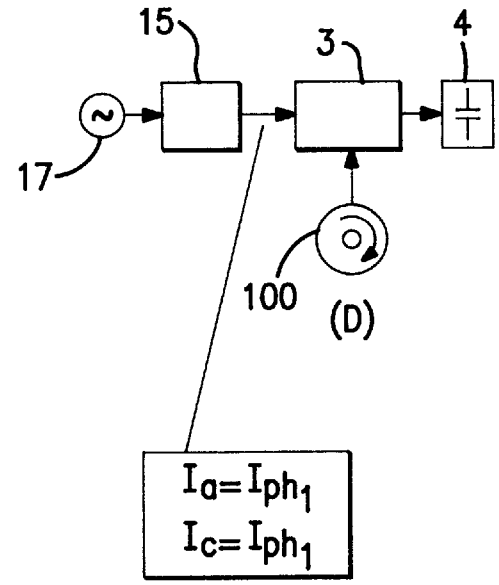
Figure 3C:
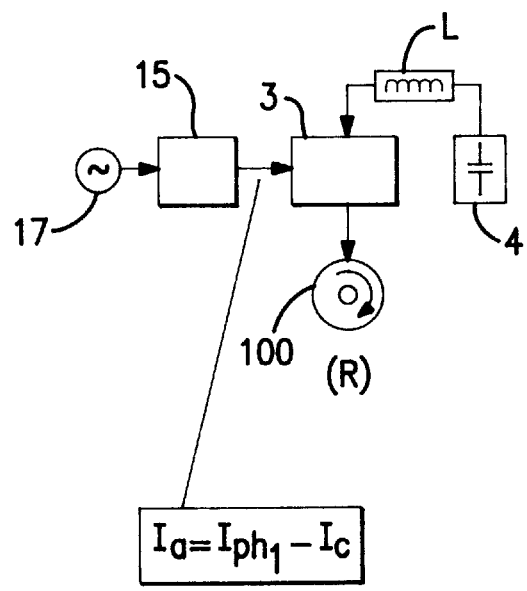

In the course of a magnetization sequence (M) of a given phase of the motor, the electrical energy is transferred from the source 17, via the rectifier stage 15 and a branch of the converter stage 3, toward a motor phase in which it is partially converted to the form of mechanical energy and as to another portion stored in the form of magnetic energy in the motor (FIG. 3A). The supply current Ia is thus equal to the sum of the currents in the three phases of the motor. When the corresponding phase switch is again blocked, there then begins a demagnetization sequence (D) in the course of which the magnetic energy stored in the motor 100 is transferred via the demagnetization diode into the storage capacitor in the form of electrostatic energy (FIG. 3B). In the course of the demagnetization sequence (D), the rectifier stage 4 continues to supply electrical energy to the system. This demagnetization is rendered possible by the fact that the voltage at the terminals of the storage capacitor is maintained at a mean voltage about double the rectified supply voltage. The chopping stage 4 is controlled in passing mode on the one hand, when the voltage at the terminals of the storage capacitor exceeds a safety limit value, and on the other hand, when the measured supply current becomes greater than a standard connected to a reference current wave. Chopping is thus carried out at a chopping frequency and at a variable cyclic ratio. In the course of an energy return sequence (R), a fraction of the energy stored in the storage capacitor C is transferred via the inductance L toward the rectifier stage 15, whilst the phase switch is thus in passing mode. The supply current Ia is thus equal to the difference between the sum ΣIph of the currents in the motor phases and the current Ic delivered by the storage capacitor C. When the measured supply current becomes less than the reference wave current, the chopping switch is thus switched to blocking mode and the energy return sequence is terminated. It can thus be provided that the control of the chopping switch TH will not be effective except when the voltage measured at the terminals of the storage capacitor C is greater than the measured rectified supply voltage.

An essential difference of the supply process according to the invention, compared to conventional processes, resides in the fact that the disturbances of the supply current are corrected without the addition of supplemental power components, by applying a variable cyclic ratio regime to the chopping switch of the C-Dump mounting.

Figure 4:
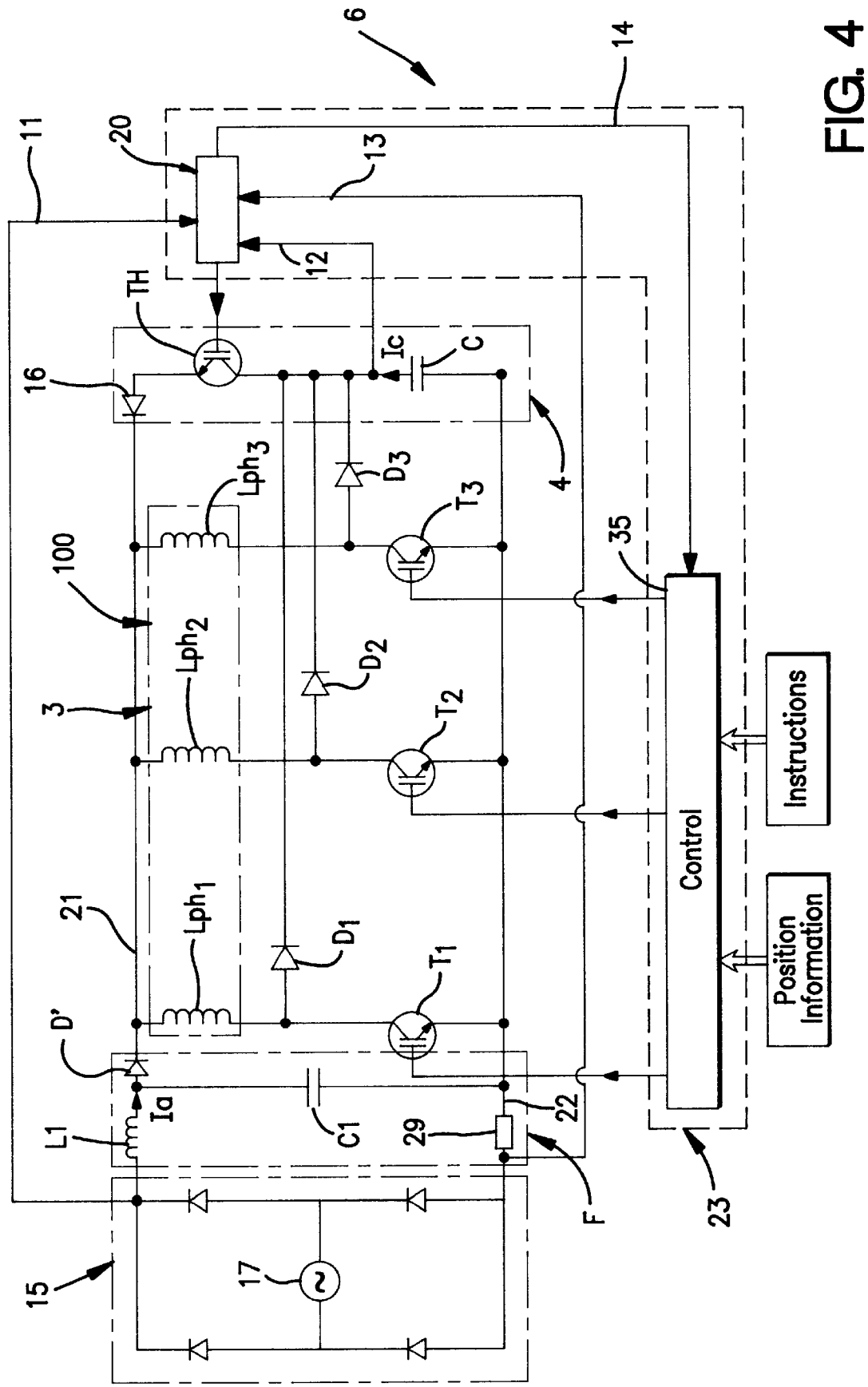
FIG. 4 shows a second embodiment of a supply circuit according to the invention.
Figure 5A:
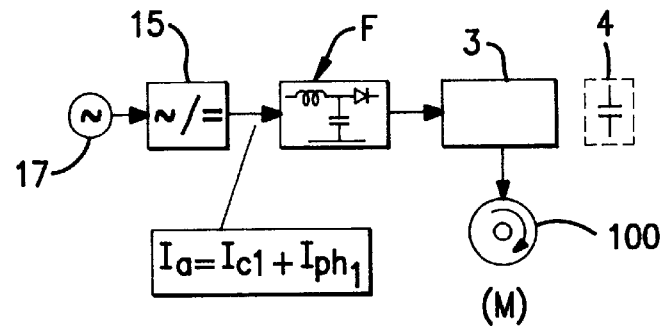
FIGS. 5A, 5B and 5C show schematically the energy transfers in the circuit shown in FIG. 4, respectively in the sequences of magnetization, demagnetization and energy return.
Figure 5B:
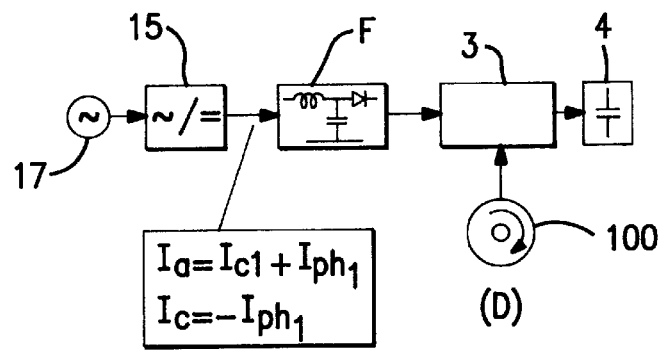
Figure 5C:
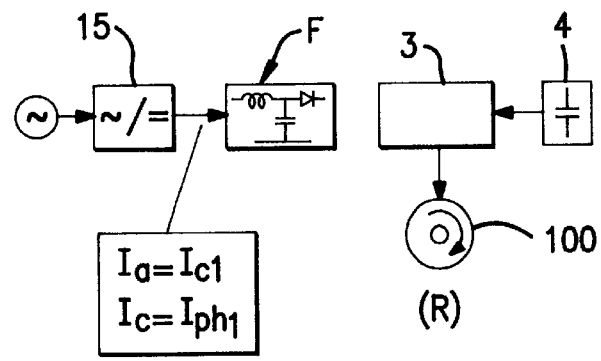

There will now be described, with reference to FIG. 4, a second embodiment of the supply process according to the invention and an example of an embodiment of a corresponding supply circuit. In FIGS. 4 and 5A to 5C, the same reference numerals are applied to identical components and modules already described with reference to FIGS. 2 and 3A to 3C. It should be noted that, for reasons of simplification, the energy flow in FIGS. 5A to 5C is shown only for a single phase.

The supply circuit 6 according to the invention comprises a rectifier stage 15, a filtering stage F, a converter stage 3 connected to the three phases of a variable reluctance motor with electronic switching 100, and an energy return stage 4. The filtering stage F comprises for example a passive filter comprising conventionally an inductance L1 and a capacitor C1, and a diode D' to isolate on the one hand the filtering stage and on the other hand the converter stage in the course of the return sequence. The energy return stage 4 is, in this particular embodiment, directly connected to the converter stage 3 without the addition of inductance nor of a free wheel diode in parallel to the chopping stage.

There will now be described the operation of the supply circuit according to the invention, at the same time as the energy transfer is carried out in the course of the different sequences of the process according to the invention, with reference to FIGS. 4 and 5A to 5C. The magnetization and demagnetization sequences (FIGS. 5A and 5B) are similar to the sequences described for the first embodiment, except for the fact that the filtering stage F is contributory. In the energy return sequences (R), when the chopping switch TH is controlled in passing mode, the voltage at the terminals of the storage capacitor C is directly applied to the high line 21. As this voltage is then necessarily higher than the rectified supply voltage, the diode D' is blocked and the supply current Ia will then decrease. As soon as a blocking order is applied to the chopping switch TH, the diode D' again becomes passing and the rectified supply current then tends to increase. It has been noted that a filter of modest size suffices. In the course of the energy return sequence, the supply current Ia is equal to the current Ic1 absorbed by the filtering capacitor C1, whilst the current Ic supplied by the capacitor C is equal to the magnetization current flowing in one or several phases.

The chopping control modules 10, 20 include preferably a power factor correction circuit (PFC) which delivers a signal indicative of the weak or strong character of the supply current, from current reference information (obtained in practice from the measurement of the rectified supply voltage) and of the information as to current supply effectively measured.

Figure 6:
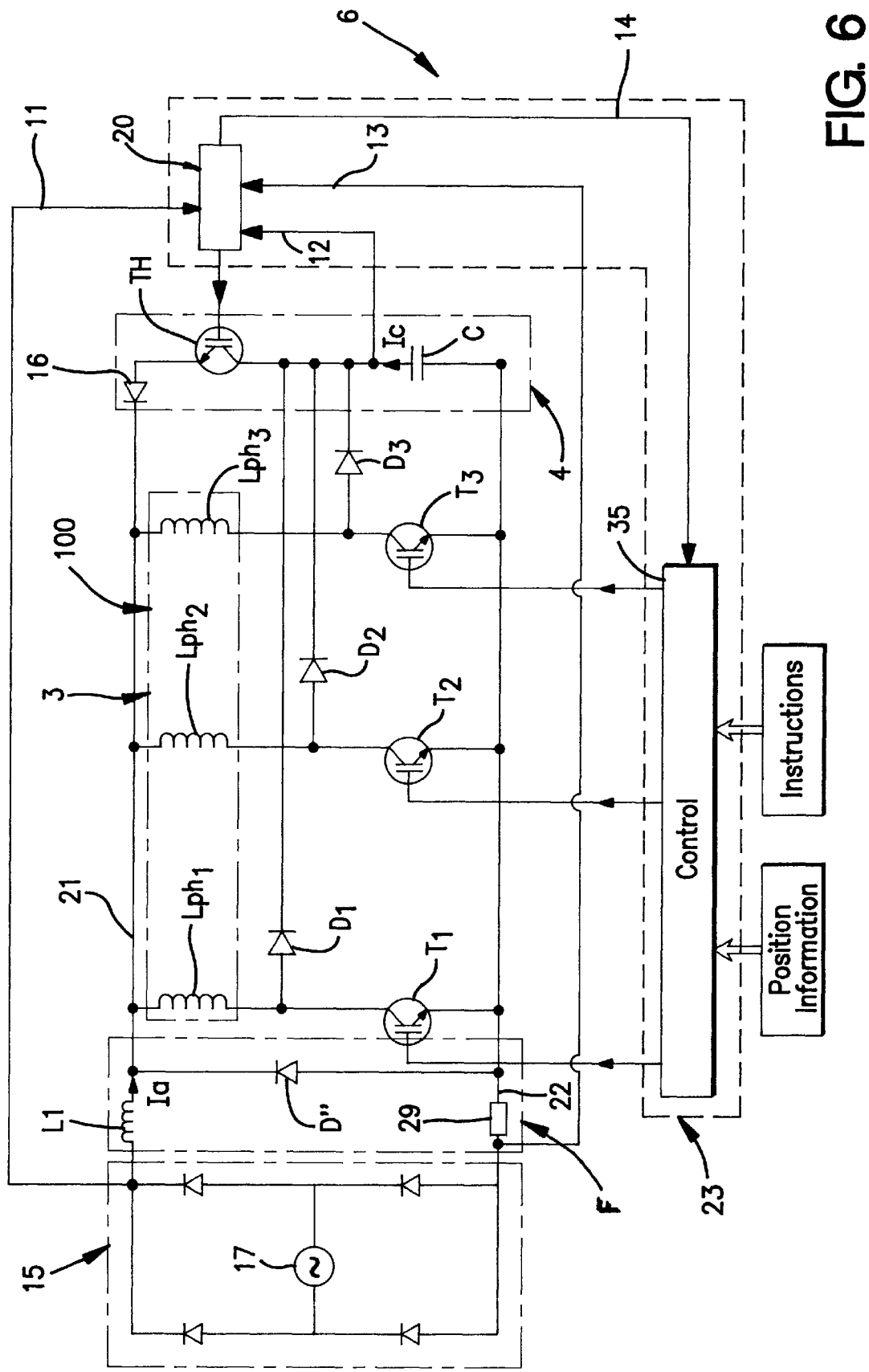
FIG. 6 is a modification of the circuit shown in FIG. 4.

FIG. 6 shows a modification of the supply circuit of FIG. 4, in which there are applied the same reference numerals to the identical components of modules already described with reference to FIG. 4. This modification is different from the supply circuit shown in FIG. 4 solely by the fact that the filtering stage F comprises, in addition to the inductance L1 disposed in the high line 21 of the circuit, a diode D" disposed between the high line 21 and low line 22 of the circuit, the anode of this diode being connected to the low line 22. Thus, this filtering stage F has the advantage of being particularly simplified, from which follows a reduction of its cost of production. The operation of this modification of the supply circuit, as well as the energy transfers carried out in the course of the different sequences of the process according to the invention, are similar to those described with reference to FIGS. 5A to 5C.

Of course the invention is not limited to the examples which have been described and of which numerous variations may be realized without departing from the scope of the invention. Thus, the number of motor phases could be as desired. The phase in chopping switches could be transistors of any technology, for example bipolar transistors, MOSFET or IGBT transistors. The control modules could be in the form of hardwired or programmed logic and could include a microprocessor. Moreover, the supply circuits according to the invention could be integrated in the form of ASIC circuits or even could be embodied with separate components.

I claim:

1. Process to supply a variable reluctance motor with electronic switching (100) from a single phase AC voltage source (17), comprising:

rectifying, in a rectifier stage (15), the voltage delivered by the single phase AC source (17) to supply a rectified voltage, successively, for each of the phases (Lph1, Lph2, Lph3) of this motor (100):

a magnetization sequence (M) of said phase (Lph1, Lph2, Lph3) comprising a transfer of energy from the rectifier stage (15) toward said phase (Lph1, Lph2, Lph3) to which is applied the rectified voltage by closing switching means (T1, T2, T3) associated with said phase (Lph1, Lph2, Lph3), a demagnetization sequence (D) of said phase (Lph1, Lph2, Lph3) comprising a transfer of energy from said phase (Lph1, Lph2, Lph3) toward a storage capacitor (C) common to all said phases (Lph1, Lph2, Lph3), upon opening said switching means (T1, T2, T3), and return sequences (R) of the energy stored in the storage capacitor (C) toward the rectifier stage (15) by control of chopping means (TH) in series with the storage capacitor (C), characterized in that it comprises monitoring the energy returned to the rectifier stage (15), so as to correct disturbances of the rectified supply current (Ia).

2. Process according to claim 1, characterized in that the disturbances of the rectified supply current (Ia) are corrected relative to a reference current wave.

3. Process according to claim 2, characterized in that it comprises also a measurement of the rectified supply current (Ia), and a comparison of this measured current with the reference current wave, to determine the disturbances to be corrected.

4. Process according to one of claims 1, characterized in that the monitoring of the returned energy comprises a modulation of the cyclic chopping ratio.

5. Process according to claim 4, characterized in that the cyclic chopping ratio is modulated about a substantially constant mean value.

6. Process according to claim 5, characterized in that the mean value of the cyclic chopping ratio is about ½.

7. Process according to claim 1 characterized in that, during the energy return sequence (R), an inductance (L) serving as a magnetic buffer is interposed between the storage capacitor (C) and the rectifier stage (15).

8. Process according to claim 1, characterized in that, during the energy return sequence (R), the energy stored in the storage capacitor (C) is directly transferred to the rectifier stage (15), and in that it comprises also a filtering of the rectified supply current (Ia).

9. Process according to claim 1, characterized in that it also comprises a correction of the power factor of the motor as a function of the measurement of the rectified supply voltage and of the rectified supply current.

10. Circuit to supply a variable reluctance motor with electronic switching (100), comprising:
   a rectifier stage (15) to deliver from a single phase AC voltage source (17) a rectified voltage,
   a converter stage (3) to supply each of the phases (Lph1, Lph2, Lph3) of said motor (100), this converter stage (3) comprising, for each phase (Lph1, Lph2, Lph3), phase switching means (T1, T2, T3) controlled to magnetize in a predetermined time window of said phase (Lph1, Lph2, Lph3) by use of the rectified voltage, these phase switching means (T1, T2, T3) being moreover controlled to demagnetize said phase (Lph1, Lph2, Lph3) by transfer of the magnetic energy stored into said phase (Lph1, Lph2, Lph3) toward a storage capacitor (C) common to all the phases of the motor (100),
   means (4) to return the energy stored in the storage capacitor (C) toward the rectifier stage (15), comprising chopping means (TH), and
   means (23, 10, 20, 35) to control the phase switching means (T1, T2, T3) and the chopping means (TH) as a function of operating instructions and measurements of the electrical quantities, namely the rectified supply current and the voltage at the terminals of the storage capacitor;
   characterized in that the control means (23, 10, 20, 35) are arranged to control according to a variable cyclical ratio of the chopping means (TH) so as to correct the disturbances observed in the rectified supply current (Ia).

11. Circuit according to claim 10, characterized in that it comprises moreover an inductance (L) disposed between the chopping means (4) and the converter stage (3) and serving as a magnetic buffer.

12. Circuit according to claim 10, characterized in that the chopping means (4) are directly connected to the converter stage (3) and in that it comprises moreover a filtering stage (F) disposed between the rectifier stage (15) and the converter stage (3).

13. Circuit according to claim 12, characterized in that the filtering stage (F) comprises an inductance (Li) disposed in the high line (21) of the rectifier stage (15), and a diode (DI) disposed between the high line (21) and low line (22) of said rectifier stage, the anode of the diode (D") being connected to said low line (22).

14. Circuit according to claim 10, characterized in that the control means (23) comprise means to correct the power factor of the motor.

* * * * *